(12) United States Patent
Gorman et al.

(10) Patent No.: US 10,779,618 B2
(45) Date of Patent: Sep. 22, 2020

(54) SHEET OF LOOP MATERIAL, METHOD AND APPARATUS FOR FORMING SAME

(71) Applicant: 3M INNOVATIVE PROPERTIES COMPANY, St. Paul, MN (US)

(72) Inventors: Michael R. Gorman, Lake Elmo, MN (US); Thomas P. Besonen, Shoreview, MN (US); Abbi G. Johnson, Hudson, WI (US); Shou-Lu G. Wang, Duluth, GA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 16/323,589

(22) PCT Filed: Aug. 7, 2017

(86) PCT No.: PCT/US2017/045660
§ 371 (c)(1),
(2) Date: Feb. 6, 2019

(87) PCT Pub. No.: WO2018/031432
PCT Pub. Date: Feb. 15, 2018

(65) Prior Publication Data
US 2019/0200712 A1  Jul. 4, 2019

Related U.S. Application Data

(60) Provisional application No. 62/371,918, filed on Aug. 8, 2016.

(51) Int. Cl.
*A44B 18/00* (2006.01)
*B29C 71/02* (2006.01)
(Continued)

(52) U.S. Cl.
CPC ...... *A44B 18/0057* (2013.01); *A44B 18/0011* (2013.01); *B29C 55/04* (2013.01);
(Continued)

(58) Field of Classification Search
CPC . A44B 18/0057; A44B 18/0011; B29C 55/04; B29C 55/06; B29C 55/08; B29C 55/18; B29C 71/02; B29C 2071/022
See application file for complete search history.

(56) References Cited

U.S. PATENT DOCUMENTS

| 4,609,581 A | 9/1986 | Ott |
| 4,770,917 A * | 9/1988 | Tochacek .................. B32B 5/02 428/95 |

(Continued)

FOREIGN PATENT DOCUMENTS

| EP | 0341993 | 11/1989 |
| EP | 0539504 | 5/1993 |

(Continued)

OTHER PUBLICATIONS

International Search report for PCT International Application No. PCT/US2017/045660 dated Oct. 27, 2017, 5 pages.

*Primary Examiner* — Jeffrey M Wollschlager

(57) ABSTRACT

A sheet of loop material having utility as the landing zone in the manufacture of, e.g. disposable diapers and having excellent properties and an exceptionally low basis weight. Methods and apparatus for forming the sheet of loop material are also disclosed.

9 Claims, 1 Drawing Sheet

(51) Int. Cl.
  *B29C 55/08* (2006.01)
  *B29C 55/06* (2006.01)
  *B29C 55/04* (2006.01)
  *B29C 55/18* (2006.01)

(52) U.S. Cl.
  CPC .............. *B29C 55/06* (2013.01); *B29C 55/08* (2013.01); *B29C 55/18* (2013.01); *B29C 71/02* (2013.01); *B29C 2071/022* (2013.01)

(56) References Cited

U.S. PATENT DOCUMENTS

| | | | |
|---|---|---|---|
| 4,861,399 A | | 8/1989 | Rajala |
| 5,032,122 A | | 7/1991 | Noel |
| 5,254,194 A | | 10/1993 | Ott |
| 5,256,231 A | | 10/1993 | Gorman |
| 5,326,612 A | | 7/1994 | Goulait |
| 5,455,992 A | * | 10/1995 | Kurschatke ............. B29C 55/08 26/99 |
| 5,611,791 A | | 3/1997 | Gorman |
| 5,616,394 A | * | 4/1997 | Gorman ................... B32B 3/06 428/99 |
| 5,624,427 A | | 4/1997 | Bergman |
| 5,669,900 A | | 9/1997 | Bullwinkel |
| 5,745,961 A | * | 5/1998 | Okawa ............... A44B 18/0023 24/442 |
| 5,904,793 A | | 5/1999 | Gorman |
| 5,974,635 A | * | 11/1999 | Murasaki ........... A44B 18/0011 24/446 |
| 5,997,981 A | | 12/1999 | McCormack |
| 6,051,094 A | | 4/2000 | Melbye |
| 6,150,002 A | | 11/2000 | Varona |
| 6,159,584 A | * | 12/2000 | Eaton ................. A61F 13/5622 428/198 |
| 6,238,767 B1 | * | 5/2001 | McCormack ...... A44B 18/0011 428/99 |
| 6,329,016 B1 | | 12/2001 | Shepard |
| 6,582,642 B1 | | 6/2003 | Buzzell |
| 6,589,638 B1 | | 7/2003 | McCormack |
| 6,719,744 B2 | * | 4/2004 | Kinnear ................ A61F 13/581 604/386 |
| 6,756,327 B2 | | 6/2004 | Martin |
| 6,783,834 B2 | | 8/2004 | Shepard |
| 6,838,154 B1 | | 1/2005 | Varona |
| 7,168,139 B2 | | 1/2007 | Seth |
| 7,195,729 B2 | | 3/2007 | Jackson |
| 7,223,314 B2 | | 5/2007 | Provost |
| 7,303,805 B2 | | 12/2007 | Seth |
| 7,331,087 B2 | | 2/2008 | Lindsay |
| 7,395,583 B2 | | 7/2008 | Clune |
| 7,799,162 B2 | | 9/2010 | Wood |
| 7,805,818 B2 | | 10/2010 | Horn |
| 8,034,431 B2 | | 10/2011 | Seth |
| 8,251,970 B2 | | 8/2012 | Klebba |
| 8,664,128 B2 | * | 3/2014 | Cree ................. A61F 13/15593 156/229 |
| 2005/0196583 A1 | | 9/2005 | Provost |
| 2006/0036230 A1 | | 2/2006 | Mills |
| 2006/0083900 A1 | * | 4/2006 | Ashraf ................ A61F 13/4902 428/182 |
| 2006/0131783 A1 | * | 6/2006 | Morman ........... A61F 13/15203 264/290.2 |
| 2006/0148354 A1 | * | 7/2006 | Shelley ............. A61F 13/15593 442/182 |
| 2006/0148359 A1 | * | 7/2006 | Van Gompel ...... A44B 18/0057 442/328 |
| 2006/0246256 A1 | | 11/2006 | Ausen |
| 2006/0288547 A1 | * | 12/2006 | Jackson .................. B29C 55/08 26/87 |
| 2007/0178273 A1 | | 8/2007 | Provost |
| 2009/0191779 A1 | * | 7/2009 | Cree ................. A61F 13/15593 442/361 |
| 2010/0040827 A1 | | 2/2010 | Horn |
| 2012/0089112 A1 | | 4/2012 | Horn |
| 2012/0204383 A1 | * | 8/2012 | Wood ..................... B29C 71/02 24/306 |
| 2012/0231206 A1 | | 9/2012 | Thompson, Jr. |
| 2012/0330266 A1 | * | 12/2012 | Zonneveld ............. B23P 13/00 604/391 |
| 2013/0025766 A1 | | 1/2013 | Erickson |
| 2013/0052403 A1 | | 2/2013 | Barker |
| 2014/0349079 A1 | * | 11/2014 | Chandrasekaran ....... B32B 3/30 428/159 |
| 2015/0096660 A1 | * | 4/2015 | Gilbert ............... A44B 18/0069 156/60 |

FOREIGN PATENT DOCUMENTS

| | | |
|---|---|---|
| EP | 0665779 | 8/1995 |
| EP | 0979639 | 2/2000 |
| EP | 1017562 | 7/2000 |
| EP | 2679112 | 1/2014 |
| JP | 4480333 | 8/2004 |
| JP | 2005-253667 | 9/2005 |
| JP | 2008-088602 | 4/2008 |
| JP | 2014-155598 | 8/2014 |
| WO | WO 2003-089705 | 10/2003 |
| WO | WO 2012-018971 | 2/2012 |
| WO | WO 2014-201221 | 12/2014 |
| WO | WO 2014-204803 | 12/2014 |
| WO | WO 2016-106043 | 6/2016 |

* cited by examiner

SHEET OF LOOP MATERIAL, METHOD AND APPARATUS FOR FORMING SAME

CROSS REFERENCE TO RELATED APPLICATIONS

This application is a national stage filing under 35 U.S.C. 371 of PCT/US2017/045660, filed Aug. 7, 2017, which claims the benefit of U.S. Application No. 62/371,918, filed Aug. 8, 2016, the disclosure of which is incorporated by reference in its/their entirety herein.

FIELD

The present disclosure relates a sheet of loop material adapted to be cut into pieces to form loop portions for fasteners of the type comprising releasably engageable hook and loop portions, or to be incorporated into items such as disposable garments or diapers. More particularly, methods and apparatus for forming loop material with an exceptionally low basis weight are disclosed.

BACKGROUND

Many sheets of loop materials are known that are adapted to be cut into pieces to form the loop portions for fasteners of the type comprising releasably engageable hook and loop portions. Such sheets of loop materials typically comprise a backing and a multiplicity of loops formed from longitudinally oriented polymeric fibers anchored in the backing and projecting from a front surface of the backing so that they may be releasably engaged with the hooks on the hook portion of such a fastener, and can be made by many methods including conventional weaving, or knitting techniques. Sheets of loop materials in which the loops are stitched into the backing are described in U.S. Pat. Nos. 4,609,581 and 4,770,917. U.S. Pat. No. 5,616,394 describes a sheet of loop material adapted to be cut into pieces to form loop portions for fasteners, which sheet of loop material includes a backing comprising a thermoplastic backing layer with generally uniform morphology, and a sheet of longitudinally oriented fibers having genrally non-deformed, anchor portions bonded or fused in the thermoplastic backing layer at spaced bonding locations, and arcuate portions projecting from a front surface of the backing between the bonding locations.

While the loop fastener portions made from many such sheets of loop materials work well with many different hook fastener portions, many of the processes by which the sheets of loop material are made are more expensive than may be desired, particularly when the loop fastener portions are intended for a limited amount of use, such as to attach a disposable diaper to an person.

SUMMARY

The present disclosure provides a sheet of loop material providing sheet of loop material comprising a backing comprising a thermoplastic backing layer and having front and rear major surfaces; and a sheet of longitudinally oriented fibers having generally non-deformed anchor portions bonded in the thermoplastic backing layer at bonding locations spaced along the backing layer, and arcuate portions projecting from the front surface of the backing between the bonding locations. Uniquely, the sheet of loop material has a basis weight of less than 40 $g/m^2$, or even less than 30 $g/m^2$.

In one aspect, the present disclosure provides a sheet of loop material comprising a backing comprising a thermoplastic backing layer and having front and rear major surfaces; and a sheet of longitudinally oriented fibers having generally non-deformed anchor portions bonded in the thermoplastic backing layer at bonding locations spaced along the backing layer, and arcuate portions projecting from the front surface of the backing between the bonding locations; wherein the basis weight of the sheet of loop material is less than 40 $g/m^2$.

In another aspect, the present disclosure provides a method of treating a sheet of loop material, comprising providing a sheet of loop material adapted to be cut into pieces to form loop portions for fasteners comprising releasably engageable hook and loop portions, said sheet of loop material comprising: a backing comprising a thermoplastic backing layer and having front and rear major surfaces; and a sheet of longitudinally oriented fibers having generally non-deformed anchor portions bonded in the thermoplastic backing layer at bonding locations spaced along the backing layer, and arcuate portions projecting from the front surface of the backing between the bonding locations; passing the sheet of loop material between a pair of interdigitated rollers so as to stretch at least a portion of the backing beyond its elastic limit in a first direction; elongating the sheet of loop material in the first direction; and annealing the sheet of loop material so as to stabilize it in its elongated condition. In some convenient embodiments, the sheet of loop material is in the form of a web of indefinite length, and the first direction is the cross web direction. In these embodiments, the method can be carried out in a roll-to-roll fashion.

In some convenient embodiments, at least one of the interdigitated rollers is heated above room temperature, and in some of these embodiments, both of the interdigitated rollers are heated. The degree of elongation in the first direction is conveniently between about 50% and 150%, and elongation of about 75% is considered suitable. The surface speed of the interdigitated rollers can be equal to the surface speed of the preheat roll, or it can be increased to impart a machine direction draw of 10, 20 or even as high as 30% but preferred to be <10% draw to maintain as much fiber arcuate as possible to preserve shear peel performance of the original web. With this degree of elongation, sheet material with a basis weight of the sheet of loop material after the annealing is less than 40 $g/m^2$, or even less than 30 $g/m^2$.

Various aspects and advantages of exemplary embodiments of the present disclosure have been summarized. The above Summary is not intended to describe each illustrated embodiment or every implementation of the present disclosure. Further features and advantages are disclosed in the embodiments that follow. The Drawings and the Detailed Description that follow more particularly exemplify certain embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which.

Figure 1:
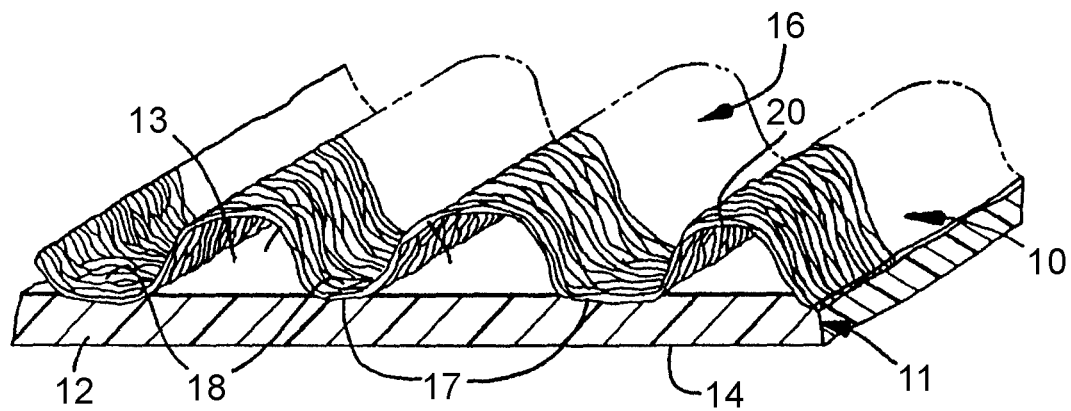
FIG. 1 is a perspective view of an embodiment of a sheet of sloop material suitable as input material for a method according to the present invention.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this disclosure.

DETAILED DESCRIPTION

As used in this Specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

For the following defined terms, these definitions shall be applied for the entire Specification, including the claims, unless a different definition is provided in the claims or elsewhere in the Specification based upon a specific reference to a modification of a term used in the following Glossary:

Glossary

The words "a", "an", and "the" are used interchangeably with "at least one" to mean one or more of the elements being described.

The phrase "comprises at least one of" followed by a list refers to comprising any one of the items in the list and any combination of two or more items in the list. The phrase "at least one of" followed by a list refers to any one of the items in the list or any combination of two or more items in the list.

The term "nonwoven" refers to a material having a structure of individual fibers or threads that are interlaid but not in an identifiable manner such as in a knitted fabric.

The term "layer" refers to any material or combination of materials on or overlaying a substrate.

The term "acrylic" refers to compositions of matter which have an acrylic or methacrylic moiety.

Words of orientation such as "atop, "on," "covering," "uppermost," "overlaying," "underlying" and the like for describing the location of various layers, refer to the relative position of a layer with respect to a horizontally-disposed, upwardly-facing substrate. It is not intended that the substrate, layers or articles encompassing the substrate and layers, should have any particular orientation in space during or after manufacture.

The term "separated by" to describe the position of a layer with respect to another layer and the substrate, or two other layers, means that the described layer is between, but not necessarily contiguous with, the other layer(s) and/or substrate.

The term "(co)polymer" or "(co)polymeric" includes homopolymers and copolymers, as well as homopolymers or copolymers that may be formed in a miscible blend, e.g., by coextrusion or by reaction, including, e.g., transesterification. The term "copolymer" includes random, block, graft, and star copolymers.

The term "structured film" refers to a film with other than a planar or smooth surface.

The term "in-line," as used herein, means that the steps are completed without the thermoplastic layer being rolled up on itself. The steps may be completed sequentially with or without additional steps in-between. For clarification, the thermoplastic layer may be supplied in rolled form and the finished laminate may be rolled up on itself.

The term "machine direction" (MD) as used herein denotes the direction of a running, continuous web during the manufacturing of the absorbent article disclosed herein. In a roll, for example, comprising a carrier web and a fastening strip, the machine direction corresponds to the longitudinal direction of the roll. Accordingly, the terms machine direction and longitudinal direction may be used herein interchangeably. The term "cross-direction" (CD) as used herein denotes the direction that is essentially perpendicular to the machine direction.

Referring now to FIG. 1 is a perspective view of an embodiment of a sheet of sloop material 10 suitable as input material for a method according to the present invention is illustrated. Sheet of loop material 10 is adapted to be cut into pieces to form the loop portions for fasteners of the type intended for limited use and having releasably engageable hook and loop portions. Generally the sheet of loop material 10 has a backing 11 comprising a thermoplastic backing layer 12 (e.g., of polypropylene) in the range of about 0.00125 to 0.025 centimeters (0.0005 to 0.010 inch) thick having generally uniform morphology, front and rear major surfaces 13 and 14, and a multiplicity of longitudinally oriented fibers in a specially formed sheet of fibers 16 having anchor generally non-deformed anchor portions 17 bonded by being embedded in the backing layer 12 at spaced elongate generally parallel bonding locations 18 that are continuous in one direction along the front surface 13 with arcuate portions 20 of the sheet of fibers 16 projecting from the front surface 13 of the backing layer 12 between the bonding locations 18 in continuous rows also extending transversely across the sheet of loop material 10. The arcuate portions 20 of the sheet of fibers 16 have a generally uniform height from the backing layer 12 of less than about 0.64 centimeters (0.250 inch) and preferably less than about 0.381 centimeters (0.150 inch), the height of the formed sheet of fibers 16 is at least one third, and preferably one half to one and one half times the distance between the bonding locations 18, the individual fibers in the sheet of fibers 16 are less than 25 denier (preferably in the range of 1 to 10 denier) in size, and the sheet of fibers 16 without the backing 11 has a basis weight in the range of 5 to 300 grams per square meter (and preferably in the range of 15 to 100 grams per square meter) measured along the first surface 13 to provide sufficient open area between the fibers in the sheet of fibers 16 along the arcuate portions 20 (i.e., between about 10 and 90 percent open area) to afford ready engagement of the individual fibers along the arcuate portions 20 by the hook portion of the fastener.

The fibers in the sheet of fibers 16 can be disposed in various directions with respect to the parallel bonding locations 18 and may or may not be bonded together at crossover points in the arcuate portions 20; can be disposed in various directions with respect to the parallel bonding locations 18 with the majority of the fibers in the sheet of fibers 16 (i.e., over 80 or 90 percent) extending in directions at about a right angle to the bonding locations 18; or all of the individual fibers in the sheet of fibers 16 can extend in directions generally at right angles to the spaced generally parallel bonding locations 18.

Figure 2:
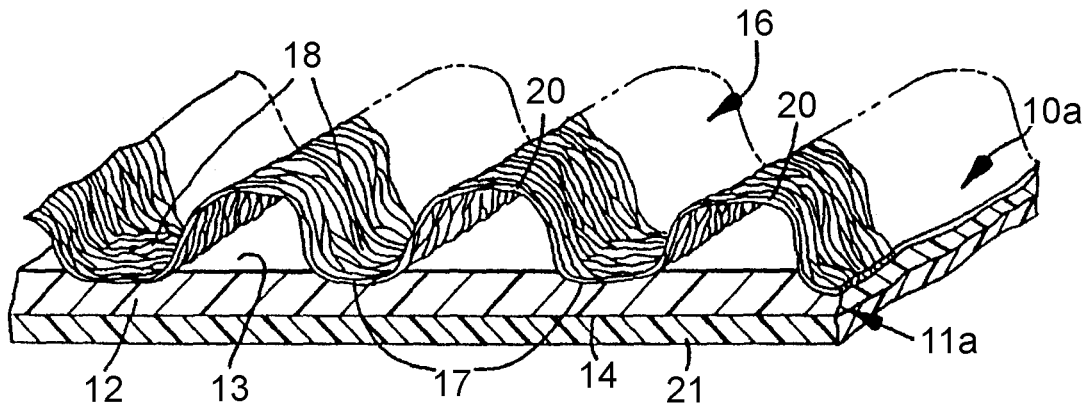
FIG. 2 is a perspective view of an alternated embodiment of a sheet of sloop material suitable as input material for a method according to the present invention.

Referring now to FIG. 2, an alternate embodiment of a sheet of loop materials according to the present invention, generally designated by the reference numeral 10a, which sheet of loop material 10a has the same structure as the sheet of loop material 10 (the same reference numerals being used with respect to the corresponding portions thereof) except that backing 11a of the sheet of loop material 10a includes a second sheet of backing materials 21, which second sheet of backing material 21 is adhered on the side 14 of the thermoplastic backing layer 12 opposite the sheet of fibers 16. The second sheet of backing material 21 in the backing 11a of the sheet of loop material 10a is a polymeric film which can be printed on one of its surfaces to provide a sheet of loop material 10a on which the printing (which could be decorative, indicate a trade name, or provide instructions) can be clearly seen through the sheet of fibers 16. Further details of materials and methods appropriate for the preparation of a sheet of loop materials suitable as input for the methods of the present disclosure may be found in U.S. Pat. No. 5,616,394, "Sheet of Loop Material, and Garments Having Such Loop Material Incorporated Therein," which is hereby incorporated by reference in its entirety.

Figure 3:
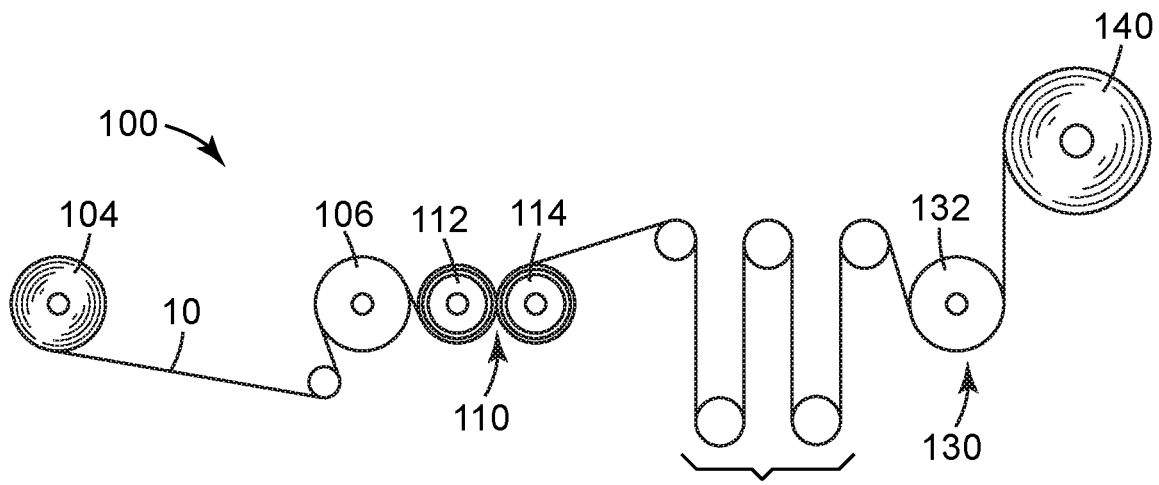
FIG. 3 is a schematic side view of an exemplary apparatus according to one embodiment of the present disclosure.

Referring now to FIG. 3 a schematic side view of an exemplary apparatus according to one embodiment of the present disclosure is illustrated. Web path 100 conveys sheet of loop material 10 with its backing layer 12 and sheet of fibers 16, in this embodiment conveniently provided as a web of indefinite length material. Sheet of loop material 10 is conveyed from unwind stand 104 around input roller 106 and into stretching station 110. In some convenient embodiments, input roller 106 may be heated to condition the sheet of loop material just prior to the stretching station. Stretching station 110 conveniently comprises a first 112 and a second 114 interdigitated roller. Passing the sheet of loop material 10 between first 112 and second 114 interdigitated rollers causes sheet of loop material 10 to stretch at least a portion of the backing 16 beyond its elastic limit in a first direction, which in this embodiment is the cross-web direction. The web path 100 then enters an elongation zone 120, which elongates the sheet of loop material 10 in the cross-web direction. The elongation zone 120 is depicted in this Figure with sheet of loop material 10 festooned in several courses, and this is often convenient from the point of view of saving floor space, but is not required. Any of several known methods for pulling the web laterally in the cross-web direction may be employed, including one or more crown rollers, a series of edge pullers, or the mechanism disclosed in U.S. Application 62/096,497, "Edge Contact Substrate Transport Method and Apparatus."

Web path 100 then conveys sheet of loop material 10 into an annealing station 130, which in the depicted embodiment is a heated annealing roller 132. With many convenient backings 12, annealing roller 132 will be operated at a temperature of between about 110° C. and 135° C. Annealing station 130 anneals the sheet of loop material 102 so as to stabilize it in its elongated condition. Web path 100 then conveys sheet of loop material 102 onto a wind-up stand 140.

Following are various, non-limiting embodiments and combinations of embodiments:

In a first embodiment, the present disclosure provides a method of treating a sheet of loop material, comprising: providing a sheet of loop material adapted to be cut into pieces to form loop portions for fasteners comprising releasably engageable hook and loop portions, said sheet of loop material comprising: a backing comprising a thermoplastic backing layer and having front and rear major surfaces; and a sheet of fibers having generally non-deformed anchor portions bonded in the thermoplastic backing layer at bonding locations spaced along the backing layer, and arcuate portions projecting from the front surface of the backing between the bonding locations; passing the sheet of loop material between a pair of interdigitated rollers so as to stretch at least a portion of the backing layer beyond its elastic limit in a first direction; elongating the sheet of loop material in the first direction; and annealing the sheet of loop material so as to stabilize it in its elongated condition.

In a second embodiment, the present disclosure provides the method of the first embodiment wherein the sheet of loop material is in the form of a web of indefinite length.

In a third embodiment, the present disclosure provides the method of the first or second embodiment, wherein at least one of the interdigitated rollers is heated above room temperature.

In a fourth embodiment, the present disclosure provides the method of any one of the first through third embodiments wherein the basis weight of the sheet of loop material after the annealing is less than 40 g/m$^2$.

In a fifth embodiment, the present disclosure provides the method of the fourth embodiment wherein the basis weight of the sheet of loop material after the annealing is less than 35 g/m$^2$.

In a sixth embodiment, the present disclosure provides the method according to any of the preceding embodiments wherein the thermoplastic backing layer comprises at least 5% of an elastomeric polyolefin.

In a seventh embodiment, the present disclosure provides the method according to the sixth embodiment wherein the elastomeric polyolefin is a metallocene elastomer.

In an eighth embodiment, the present disclosure provides the method according to claims the sixth or seventh embodiment wherein the thermoplastic backing layer comprises elastomeric polyolefin in an amount between 5 and 20%.

In a ninth embodiment, the present disclosure provides a sheet of loop material comprising: a backing layer comprising a thermoplastic backing layer and having front and rear major surfaces; and a sheet of fibers having generally non-deformed anchor portions bonded in the thermoplastic backing layer at bonding locations spaced along the backing layer, and arcuate portions projecting from the front surface of the backing between the bonding locations; wherein the basis weight of the sheet of loop material is less than 40 g/m$^2$.

In a tenth embodiment, the present disclosure provides the sheet of loop material of the ninth embodiment wherein the basis weight of the sheet of loop material is less than 30 g/m$^2$.

In an eleventh embodiment, the present disclosure provides the method according to the ninth or tenth embodiments wherein the thermoplastic backing layer comprises at least 5% of an elastomeric polyolefin.

In a twelfth embodiment, the present disclosure provides the method according to claim eleventh embodiment wherein the elastomeric polyolefin is a metallocene elastomer.

In a thirteenth embodiment, the present disclosure provides the method according to the eleventh or twelfth embodiments wherein the thermoplastic backing layer comprises elastomeric polyolefin in an amount between 5 and 20%.

In an fourteenth embodiment, the present disclosure provides a web path comprising: a source of a sheet of loop material comprising: a backing layer comprising a thermoplastic backing layer and having front and rear major surfaces; and a sheet of fibers having generally non-deformed anchor portions bonded in the thermoplastic backing layer at bonding locations spaced along the backing layer, and arcuate portions projecting from the front surface of the backing between the bonding locations; a stretching station for stretching at least a portion of the backing beyond its elastic limit in a first direction; an elongation station for elongating the sheet of loop material in the first direction; an annealing station for stabilizing the sheet of loop material in its elongated condition.

In a fifteenth embodiment, the present disclosure provides the web path of the fourteenth embodiment wherein the stretching station comprises a first and a second interdigitated roller.

In a sixteenth embodiment, the present disclosure provides the method of the fourteenth or fifteenth embodiment, wherein the sheet of loop material is in the form of a web of indefinite length.

In a seventeenth embodiment, the present disclosure provides the web path of the sixteenth embodiment further comprising a wind-up station.

In an eighteenth embodiment, the present disclosure provides the web path of any of the fourteenth through seventeenth embodiments wherein the annealing station comprises an annealing roller having a temperature of between about 110° C. and 140° C.

Embodiments of the present disclosure have been described above and are further illustrated below by way of the following Examples, which are not to be construed in any way as imposing limitations upon the scope of the present disclosure. On the contrary, it is to be clearly understood that resort may be had to various other embodiments, modifications, and equivalents thereof which, after reading the description herein, may suggest themselves to those skilled in the art without departing from the spirit of the present disclosure and/or the scope of the appended claims.

EXAMPLES

The following examples are intended to illustrate exemplary embodiments within the scope of this disclosure. Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. At the very least, and not as an attempt to limit the application of the doctrine of equivalents to the scope of the claims, each numerical parameter should at least be construed in light of the number of reported significant digits and by applying ordinary rounding techniques.

Example 1

An apparatus was assembled generally as described in connection with FIG. 3. An eight inch (20.3 cm) wide sheet of loop material in the form of a web of indefinite length on a roll, commercially available as EBL LIGHT from 3M Company of St. Paul, Minn. was positioned on the unwind stand. This input material had a basis weight of 62 g/m$^2$, and was conveyed at a line speed of 50 m/min. The web was conveyed around the input roller which was heated to a surface temperature of 275° C. The web then entered the stretching station, which included a pair of interdigitated rolls having an intermesh of 0.15 inches (3.81 mm), creating a nominal 2× elongation in the cross-web direction. The web then entered an elongation station employing the mechanism disclosed in U.S. Application 62/096,497, "Edge Contact Substrate Transport Method and Apparatus."

The elongated web was then conveyed to an annealing station comprising a 12 inch (30 cm) wide, 10 inch diameter (25 cm) steel roll having a surface temperature of 135° C. The annealed web was then conveyed to a wind-up stand. After the run, the material was found to be dimensionally stable in the cross-web direction, ending up at 15.5 inches (39.4 cm) wide and having a basis weight of 32 g/m$^2$. The resulting material was found to have suitable peel, shear, and tensile strengths for use as a landing zone in disposable diapers.

Example 2

An apparatus was assembled generally as described in connection with FIG. 3. A sheet of non-woven fabric in the form of a web of indefinite length on a roll, formed from very high elongation carded polypropylene fibers, point bonded at 3% of the surface area, 15 cm wide, and commercially available as FPN 570P from Fitesa of Simpsonville, S.C., was positioned on the unwind stand. The non-woven fabric was converted into a web of loop material having 10 bonds per inch in the machine direction by generally following the disclosure of U.S. Pat. No. 5,616,394, "Sheet of Loop Material, and Garments Having Such Loop Material Incorporated Therein," laminating the non-woven fabric within a nip to a molten, extruded backing. The molten material forming this backing was composed 90% by weight of a polypropylene copolymer commercially available as TOTAL 5571 from Total of Courbevoie, France, and 10% metallocene elastomeric polyolefin commercially available as VISTAMAXX 7810 from Exxon Mobil of Irving, Tex. This web of loop material had a basis weight of 62 g/m$^2$. This material was then wound up.

The web of loop material was then unwound and conveyed at a line speed of 50 m/min. The web was conveyed around the preheat roller which was heated to a surface temperature of 200° F. (93° C.). The web then entered the stretching station, which included a pair of interdigitated rolls that were also internally heated to 200° F. (93° C.) by circulating oil. Each disc in the interdigitated roll had a thickness of 0.030 inch (0.76 mm) and were spaced at a pitch of 0.100 inch (2.54 mm) and had an inter-engagement of 0.086 inch (2.18 mm). These dimension created a nominal 169% area increase in the web of loop material, comprising 155% in the CD and 109% in the MD. Basis weight dropped to 35 g/m$^2$. The web then entered an elongation station employing the mechanism disclosed in U.S. Application 62/096,497, "Edge Contact Substrate Transport Method and Apparatus." The width of the web of loop material was then 8.9 inches (226 mm).

The elongated web was then conveyed to an annealing station comprising a 12 inch (30 cm) wide, 10 inch diameter (25 cm) steel roll having a surface temperature of 135° C. The web was applied with the backing side against the roll, and an edge contact device was employed at the annealing roll to place the web firmly and wrinkle-free against the annealing roll. This was observed to improve flatness and eliminate wrinkles in the annealed web. The annealed web was then conveyed and wrapped with the backing side around a chill roll operated at a temperature of 50° F. (10° C.). The annealed web was then conveyed to a wind-up stand. After the run, the material was found to be dimensionally stable in the cross-web direction, ending up at 8.9 inches (226 mm) wide and having a basis weight of 35 g/m$^2$. The resulting material was found to have suitable peel, shear, and tensile strengths for use as a landing zone in disposable diapers.

Example 3

A sheet of loop material was prepared generally as set forth in Example 1 of U.S. Pat. No. 5,256,231, "Method for Making a Sheet of Loop Material," with the following particulars and exceptions. That reference is hereby incorporated by reference as if rewritten. The upper corrugating member (reference numeral 27 in U.S. Pat. No. 5,256,231) was provided with 10 teeth per lineal inch (3.95 teeth per linear cm) with the teeth in the cross direction of the roller face. The teeth were polished to a very smooth surface, and the temperature of the roller's surface was controlled at 100° C. The lower corrugating member (reference numeral 26 in U.S. Pat. No. 5,256,231) had teeth positioned to mate with the teeth of the upper corrugating member, and the temperature of the lower corrugating member's surface was controlled at 160° C. The surface between the teeth was roughened to achieve fiber adhesion. These rollers were mated with a nominal gap of between about 0.013 to 0.020 inch (0.33 mm to 0.51 mm) clearance between the side walls of the teeth.

A sheet of fibers was provided as a premade nonwoven fabric, rather than being carded in an online process. This sheet of fibers was provided from carded hydrophobic polypropylene fibers, having a nominal basis weight of 22 g/m$^2$, and commercially available as FPN 570D from Fitesa of Simpsonville S.C. This nonwoven fabric had been carded with a very high degree of elongation in the machine direction. A roll of this nonwoven fabric was mounted on an unwind stand and advanced through the two corrugating members as a line speed of 25 m/min. After the corrugation was imposed on the nonwoven fabric by the corrugating members, it remained on the periphery of the lower corrugating member for 135 degrees of arc before contacting a molten polymer extrudate from a die (reference numeral 24 in U.S. Pat. No. 5,256,231). More specifically, the molten polymer was a high impact polypropylene copolymer having a melt flow index of 7 g/10 min, commercially available as TOTAL 5571 from Total Refining and Chemicals of Courbevoie, FR. This material was extruded at 220° C. from a flat film die having a slot width of 14 inches (35.6 cm), commercially available from EDI of Chippewa Falls, Wis. The molten polymer bonded to the corrugated nonwoven only at the teeth and at the same time the molten resin was frozen on a cooling roller (reference numeral 25 in U.S. Pat. No. 5,256,231) which is controlled at 18° C. The sheet of loop material was then wound up on a core.

The sheet of loop material was then placed upon the unwind stand of an apparatus generally as described in connection with FIG. 3. The sheet of loop material was then advanced at a line speed of 50 m/min. The sheet of loop material was conveyed around a smooth-surfaced input roller which was heated to 93° C. such that the film side was in contact of the input roller over a wrap of 270 degrees of arc. The sheet of loop material was then conveyed to the first and second interdigitated rollers, which were independently driven at a speed such that surface speed of the input roller was 0.95 of the surface speed of the first and second interdigitated rollers.

The first and second interdigitated rollers had a teeth spacing of 1 inch (2.54 mm), the tips of the teeth had radius at 0.03 inch (0.038 mm) and a depth of 0.21 inch (5.3 mm). The interdigitating rollers were heated to 93° C. surface temperature and the sheet of loop material was wrapped around the first interdigitated roller over 180 degrees of arc. These parameters caused the sheet of loop material to stretch in the cross direction a nominal distance 94% of additional width from input width. After exit from the first and second interdigitated rollers stretched sheet entered the elongation zone to pull the cross direction wrinkles taut.

Upon emerging from the elongation zone, the stretched sheet was conveyed over an annealing roller having a diameter of 12 inches (304 mm) and heated to a temperature of 132° C. such that the stretched sheet was wrapped around the annealing roller over 270 degrees of arc. The annealed sheet of loop material was then conveyed around a smooth cooling roll having a diameter of 7 inches (177 mm) at 10° C. to set and lock the film backing so it remained smooth and such that the wrinkles imposed by the stretching were substantially reduced in visibility.

The above parameters caused the cross direction dimension to increase by 170% from original. The basis weight was reduced from 63 g/m$^2$ to 38 g/m$^2$, a 40% reduction. The final sheet of loop material was tested for peel and shear which compared very favorably to peel and shear prior to the cross-direction stretching, with nominal losses of only 10 to 15% in these parameters. The fibers were very soft to the touch, which can be important in wearable absorbent applications. Upon close visual inspection there were some small holes noted in the final sheet of loop material, but these were less than 300 microns in diameter, with less than 50 holes/cm$^2$ Example 4

A sheet of loop material stretched in the cross direction was produce according to the procedure of Example 3, with the exception that the molten polymer extrudate was a high impact polypropylene copolymer having a melt flow index of 4 g/10 min, commercially available as TOTAL 4481WZ from Total Refining and Chemicals. The finished sheet of loop material was visually inspected and found to have few holes in the backing compared to Example 3. Further, the peel and shear properties were similar to that achieved in Example 3. The sheet was very soft to the touch.

Example 5

A sheet of loop material stretched in the cross direction was produce according to the procedure of Example 3, with the exception that the molten polymer extrudate was a low melting point, high ethylene random propylene copolymer having a melt flow index of 10 g/10 min, commercially available as TOTAL 8650 from Total Refining and Chemicals. The finished sheet of loop material was visually inspected and found to have zero holes in the backing. Further, the peel and shear properties were similar to that achieved in Example 3. The sheet was very soft to the touch, and had a clear backing.

Example 6

A sheet of loop material stretched in the cross direction was produce according to the procedure of Example 3, with the exception that the molten polymer extrudate was a propylene homopolymer having a melt flow index of 12 g/10 min, commercially available as P4G4Z-011A from Flint Hills Resources of St Paul, Minn. The finished sheet of loop material was visually inspected and found to have very few holes in the backing. Further, the peel and shear properties were similar remained excellent compared to a non-stretched sample.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. Furthermore, all publications, published patent applications and issued patents referenced herein are incorporated by reference in their entirety to the same extent as if each individual publication or patent was specifically and individually indicated to be incorporated by reference. Various exemplary embodiments have been described. These and other embodiments are within the scope of the following listing of disclosed embodiments.

What is claimed is:

1. A method of treating a sheet of loop material, comprising:
    providing a sheet of loop material adapted to be cut into pieces to form loop portions for fasteners comprising releasably engageable hook and loop portions, said sheet of loop material comprising:
        a backing comprising a thermoplastic backing layer and having front and rear major surfaces; and
        a sheet of fibers having generally non-deformed anchor portions bonded in the thermoplastic backing layer at bonding locations spaced along the backing layer, and arcuate portions projecting from the front surface of the backing between the bonding locations;
    passing the sheet of loop material between a pair of interdigitated rollers so as to stretch at least a portion of the backing layer beyond its elastic limit in a first direction;
    elongating the sheet of loop material in the first direction 50% to 150%; and
    annealing the sheet of loop material so as to stabilize it in its elongated condition.

2. The method according to claim 1 wherein the sheet of loop material is in the form of a web of indefinite length.

3. The method according to claim 1 wherein at least one of the interdigitated rollers is heated above room temperature.

4. The method according to claim 1 wherein the basis weight of the sheet of loop material after the annealing is less than 40 g/m$^2$.

5. The method according to claim 4 wherein the basis weight of the sheet of loop material after the annealing is less than 35 g/m$^2$.

6. The method according to claim 1 wherein the thermoplastic backing layer comprises at least 5% by weight of an elastomeric polyolefin.

7. The method according to claim 6 wherein the elastomeric polyolefin is a metallocene elastomer.

8. The method according claim 6 wherein the thermoplastic backing layer comprises elastomeric polyolefin in an amount between 5 and 20% by weight.

9. The method according to claim 6 wherein the basis weight of the sheet of loop material is less than 35 g/m$^2$.

* * * * *